(12) United States Patent  
Barbier et al.

(10) Patent No.: US 10,877,153 B2  
(45) Date of Patent: Dec. 29, 2020

(54) TIME OF FLIGHT BASED 3D SCANNER

(71) Applicant: STMicroelectronics, Inc., Coppell, TX (US)

(72) Inventors: Dominique Paul Barbier, Scotts Valley, CA (US); Xiaoyong Yang, San Jose, CA (US)

(73) Assignee: STMICROELECTRONICS, INC., Coppell, TX (US)

( * ) Notice: Subject to any disclaimer, the term of this patent is extended or adjusted under 35 U.S.C. 154(b) by 568 days.

(21) Appl. No.: 15/617,875

(22) Filed: Jun. 8, 2017

(65) Prior Publication Data

US 2018/0356525 A1 Dec. 13, 2018

(51) Int. Cl.
  *G01S 17/89* (2020.01)
  *G01S 17/10* (2020.01)
  *G01S 17/86* (2020.01)

(52) U.S. Cl.
  CPC .............. *G01S 17/89* (2013.01); *G01S 17/10* (2013.01); *G01S 17/86* (2020.01)

(58) Field of Classification Search
  CPC ... G06T 19/006; G06T 7/0051; G06T 7/0048; G06T 2207/30244; G06T 2207/10028
  See application file for complete search history.

(56) References Cited

U.S. PATENT DOCUMENTS

| 2011/0080475 A1* | 4/2011 | Lee .................. G06F 3/017 348/77 |
| 2016/0148433 A1* | 5/2016 | Petrovskaya ......... G06T 19/006 345/633 |
| 2017/0184704 A1* | 6/2017 | Yang .................. G06T 7/593 |

OTHER PUBLICATIONS

Cui, Y. et al., "3D Shape Scanning with a Time-of-Flight Camera," IEEE Conference on Vision and Pattern Recognition (CVPR), 8 pgs., Jun. 13-18, 2010.

* cited by examiner

*Primary Examiner* — Luke D Ratcliffe  
(74) *Attorney, Agent, or Firm* — Seed IP Law Group LLP

(57) ABSTRACT

The present disclosure is directed to a method and system for scanning an object or environment with a ranging sensor. The method involves rotating a ranging sensor around a rotation reference point and associating the distances measured with the ranging sensor with rotation measurements from a rotation sensor fixed to the ranging sensor. The associated data is used to populate a data plot or data table to be used to generate three-dimensional models.

17 Claims, 10 Drawing Sheets

TIME OF FLIGHT BASED 3D SCANNER

BACKGROUND

Technical Field

The present disclosure is directed to a method and system for scanning an object or environment with a time of flight sensor and a rotation sensor and, in particular, to a method or system for scanning an object or environment to generate a three-dimensional (3D) model.

Description of the Related Art

Current object scanners are large and expensive. These two-dimensional and three-dimensional scanners use large structures that completely enclose an object to be scanned. The object is rotated inside the structure and an array of cameras scan the rotating object. Alternatively, the array of cameras is rotated around the object on a track in the structure.

In these object scanners, data from the array of cameras is correlated to rotation angle of the object or the cameras by monitoring motor movement in the motor driving rotation of the object to be scanned or of the motor driving the array of ranging sensors on the track. The rotation angle is associated with the camera data to build a relief map that depicts depth as a function of rotation. This relief map is transmitted to a processor to build a 3D model of the object.

BRIEF SUMMARY

The present disclosure is directed to a device that allows for hand-held three-dimensional scanning of an object. The device includes a time-of-flight distance sensor with a rotation sensor, such as an accelerometer or gyroscope in one embodiment. These time-of-flight sensor outputs distance information as the rotation sensor tracks rotation. This information can be processed to output a 3D model of the object.

The present disclosure is also directed to a method of scanning an object that includes scanning an object with a ranging sensor and detecting rotation of the ranging sensor with a rotation sensor, which can be any type of inertial sensor such as an accelerometer or a gyroscope. In some embodiments, the ranging sensor is held in a fixed position relative to the object or environment to be scanned. At the fixed position, the ranging sensor is then rotated about an axis through the fixed position to scan the object or environment with the field of view of the ranging sensor scanning in a sweeping motion across the object or environment. The sweeping motion corresponding to a rotation around the axis in the range of 15 and 30 degrees, for example. The rotation sensor is fixed with respect to the ranging sensor, thus as the ranging sensor is rotated, the rotation sensor determines the amount of rotation of the ranging sensor, such as a number of degrees rotated. The ranging data from the ranging sensor and rotation data from the rotation sensor are then correlated and output for processing.

Said differently, the ranging data can output a first and a second distance detected during at a first time and a second time. The rotation sensor outputs a starting position associated with the first time and an angle of rotation associated with the second time, which corresponds to a rotation around the axis. The first and second distances in conjunction with the rotation data can be processed to output a relief map that represents information about the object in the environment. Taken a step further, as the distance information and the related rotation information is repeated over a time interval a 3-D representation of the object or environment can be generated.

In other embodiments, using a ranging sensor and a rotation sensor fixed with respect to each other on a body, such as a cell phone, an acceleration associated with the ranging sensor can be ascertained to detect translation movement of the ranging sensor. This movement data can be used to improve the accuracy of models of the object or environment. The ranging sensor can be a multi-zone ranging sensor, which outputs multiple distances from the ranging sensor in a single detection step. Each output set of distances will have corresponding rotation information that can be processed to provide information about the environment in the field of view.

Data table stitching can be used to detect and compensate for movement in the ranging sensor off of the fixed position or axis. Using acceleration data, table stitching, or other position detection method, the method of scanning can account for movement of the ranging sensor off of the fixed position. In other embodiments, the ranging sensor is not held in a fixed position relative to the object or environment to be scanned, and instead is rotated around the object or environment while keeping the ranging sensor facing the object to be scanned. The rotation sensor is fixed with respect to the ranging sensor. Thus, as the ranging sensor is rotated, the rotation sensor determines the amount of rotation of the ranging sensor around the object or environment. The ranging data from the ranging sensor and the rotation sensor are then correlated and output for processing, such as to provide a 3D representation of the image area.

The present disclosure is also directed to a system for range scanning. The system includes a ranging sensor coupled to a rotation sensor and a processor. The ranging sensor outputs data and the rotation sensor outputs rotation. The processor collects the outputs and correlates values of the ranging data to values of the rotation data.

The present disclosure is also directed to a method for generating a depth model. The method for generating a depth model includes determining angular positions of a ranging sensor and measuring depths with the ranging sensor. The depths and angular positions are then associated together to form a depth model.

BRIEF DESCRIPTION OF THE SEVERAL VIEWS OF THE DRAWINGS

FIG. 1b is a plot of the ranging data collected in FIG. 1a.

DETAILED DESCRIPTION

Figure 1A:
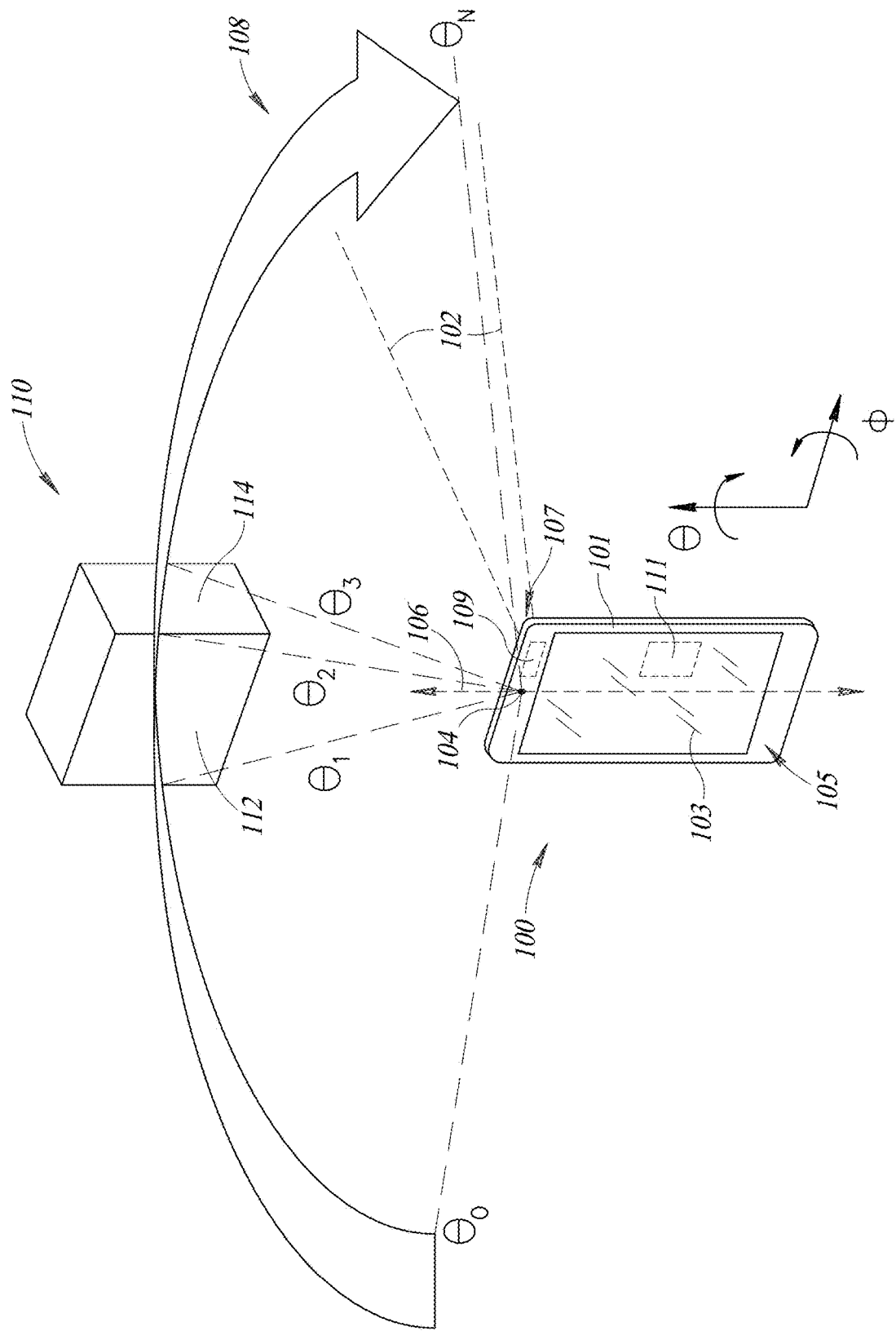
FIG. 1a is a perspective view of one embodiment of scanning an object.

In the following description, certain specific details are set forth in order to provide a thorough understanding of various embodiments of the disclosure. However, one skilled in the art will understand that the disclosure may be practiced without these specific details. In other instances, well-known structures associated with electronic components have not been described in detail to avoid unnecessarily obscuring the descriptions of the embodiments of the present disclosure.

Unless the context requires otherwise, throughout the specification and claims that follow, the word "comprise" and variations thereof, such as "comprises" and "comprising," are to be construed in an open, inclusive sense; that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used in the specification and appended claims, the use of "correspond," "corresponds," and "corresponding" is intended to describe a ratio of or a similarity between referenced objects. The use of "correspond" or one of its forms should not be construed to mean the exact shape or size.

The present disclosure is directed to methods, systems, and devices for distance (or depth) modeling of an object or an environment. The devices include a ranging sensor and a rotation sensor. The ranging sensor detects distances from the ranging sensor and an obstruction, such as an object or the environment around the device. In addition, the rotation sensor detects rotation of the ranging sensor, i.e. a change in an orientation or angle from a reference point. The device then correlates the distances with rotation, and outputs the paired data to represent the obstruction.

The rotation can be detected around more than one axis and the output is a relief map that depicts distance as a function of the rotation around the more than one axis. In addition, the rotation can be around one or more axes that pass through the ranging sensor. Alternatively, the rotation is around one or more axes that pass through a target object. The rotation is around one or more axes that pass through any point. In addition, additional movement detection can provide position data to account for changes in position of the ranging sensor.

FIG. 1a is a perspective view of one embodiment of a distance scanning system 100 for scanning an object 110 or an environment. The distance scanning system 100 can be an application-specific device that is specific to scanning the object or the environment, such that the scanning system is stand-alone and includes a ranging sensor, a rotation sensor, and a processor. As shown in FIG. 1a, the distance scanning system 100 is integrated within a hand-held mobile device 101. The mobile device includes other functional capabilities in addition to scanning the object or the environment, such as the functions of a smartphone or tablet computer. Once the object is scanned, the scanning system 100 can output a map or 3D representation of the scanned object on a display 103 of the mobile or hand-held device. During operation, the distance scanning system 100 is held by a user or supported with some other supporting structure, such as a mount or a platform.

The mobile device includes the display 103 on a first side 105 of the mobile device 101. The display 103 may be a touch screen or other interactive interface where the user can select from the functions of the mobile device. On a second side 107 of the mobile device a ranging sensor 109 is included that includes a field of view 102 extending from the second side 107 of the mobile device. The mobile device 101 also includes inertial sensors 111, which may be accelerometers or gyroscopes in some embodiments.

The distance scanning system is shown in FIG. 1a with respect to a first reference axis 8 and a second reference axis $\phi$. The first reference axis 8 has a vertical orientation and the second reference axis $\phi$ has a horizontal orientation The second reference axis $\phi$ is orthogonal to the first reference axis 8. The system uses the inertial or rotation sensor 111 to detect changes in rotation from a first distance measurement to a second distance measurement about the first and second reference axis.

The ranging sensor 109 detects distances from the ranging sensor 109 to an obstruction or object 110 in the field of view 102. The ranging sensor 109 and the rotation sensor can be initiated or triggered by a polling or control signal from a processor. The ranging sensor 109 is fixed with respect to the rotation sensor 111.

A rotation reference point 104 coincides with the ranging sensor 109 of the distance scanning system 100. The rotation reference point 104 is a point identified by the system that is associated with a first rotation axis 106. In use, the ranging sensor 109 is rotated around the first rotation axis 106 sweeping from left to right, scanning an area of interest. In one embodiment, a series of sweeps from left to right and back from right to left, can gather sufficient data points to provide a user with three dimensional depth information about the object scanned. The ranging sensor 109 is fixed with respect to the rotation reference point 104. Thus the distance scanning system 100 changes orientation as it is rotated without changing position with respect to the rotation reference point. The movement from left to right and back again is tracked by the system with respect to the reference point. In this Figure, the environment is simplified to focus on rotation about the first axis 106. However, in other variations, the system will track and process rotation about both the first axis 106 and a second axis that is transverse to the first axis 106 and crosses at the rotation reference point 104.

To measure rotation around the rotation reference point 104, the distance scanning system 100 processes information output from the rotation sensor 111. The rotation sensor 111 detects rotation around at least one axis. The rotation sensor 111 is fixed with respect to the ranging sensor 109. For example, the distance scanning system 100 can include a frame that is rigid, with the ranging sensor 109 and the rotation sensor 111 fixed to the frame. As such, the rotation sensor 111 detects rotation around the rotation reference point 104. The rotation sensor 111 can directly detect rotation around the rotation reference point 104. Alternatively, the rotation sensor 111 can indirectly detect rotation around the rotation reference point 104. The rotation sensor 111 may include programmable logic to compute rotation around the rotation reference point 104, or this computing may be done by another component, such as a processor or microcontroller. One type of rotation sensor is a gyroscope which can detect rotation about three axes. Other types of rotation sensors include any one of a rotation, force, displacement, acceleration, or similar type of sensor or sensors.

The first axis 106 passes through the rotation reference point 104. The first axis 106 is an axis about which the user pivots the ranging sensor 109 to complete a scan by the distance scanning system 100. The first axis 106 is parallel to the first reference axis 8.

As the distance scanning system 100 scans the area of interest, the field of view 102 rotates along a rotation path 108. The rotation path 108 is shown in FIG. 1a as beginning on the left side of the figure and tracking across the figure to end at the right side of the figure. Alternatively, the rotation path 108 operates in reverse, or operates only in part. The rotation path 108 is expressed as an angle $\theta$. The distance is captured at various points along the rotation path and a change in the angle is captured at each point where a distance is captured. For example, a first distance D1 corresponds to a first change in angle of $\theta$. The change in angle reflects an amount of rotation between the prior distance measurement to the current distance measurement.

As the field of view 102 of the ranging sensor 109 scans along the rotation path 108, the field of view 102 passes over the object 110. The object 110 is one of many different possible types of detectable obstructions. The obstruction can be a small device or article. Alternatively, the obstruction is a large device or article, is multiple objects, or is the contours of the surrounding environment. As shown in FIG. 1a, the object 110 is a three-dimensional rectangular cuboid that is presented with one vertex closer to the distance scanning system 100 than any other vertex of the object 110. The object 110 is shown positioned at approximately a center of the rotation path 108.

The object 110 is shown having a first surface 112 and a second surface 114. The first and second surfaces 112, 114 are any one of a number of surfaces. For example, the first and second surfaces 112, 114 are mirrored surfaces, textured surfaces, transparent glass surfaces, or any other type of surface detectable by the ranging sensor 109. The first surface 112 and the second surface 114 can also be different types of surfaces. In FIG. 1a, the first surface 112 and the second surface 114 are both planar surfaces; however, the first and second surfaces 112, 114 can have different shapes.

Figure 1B:
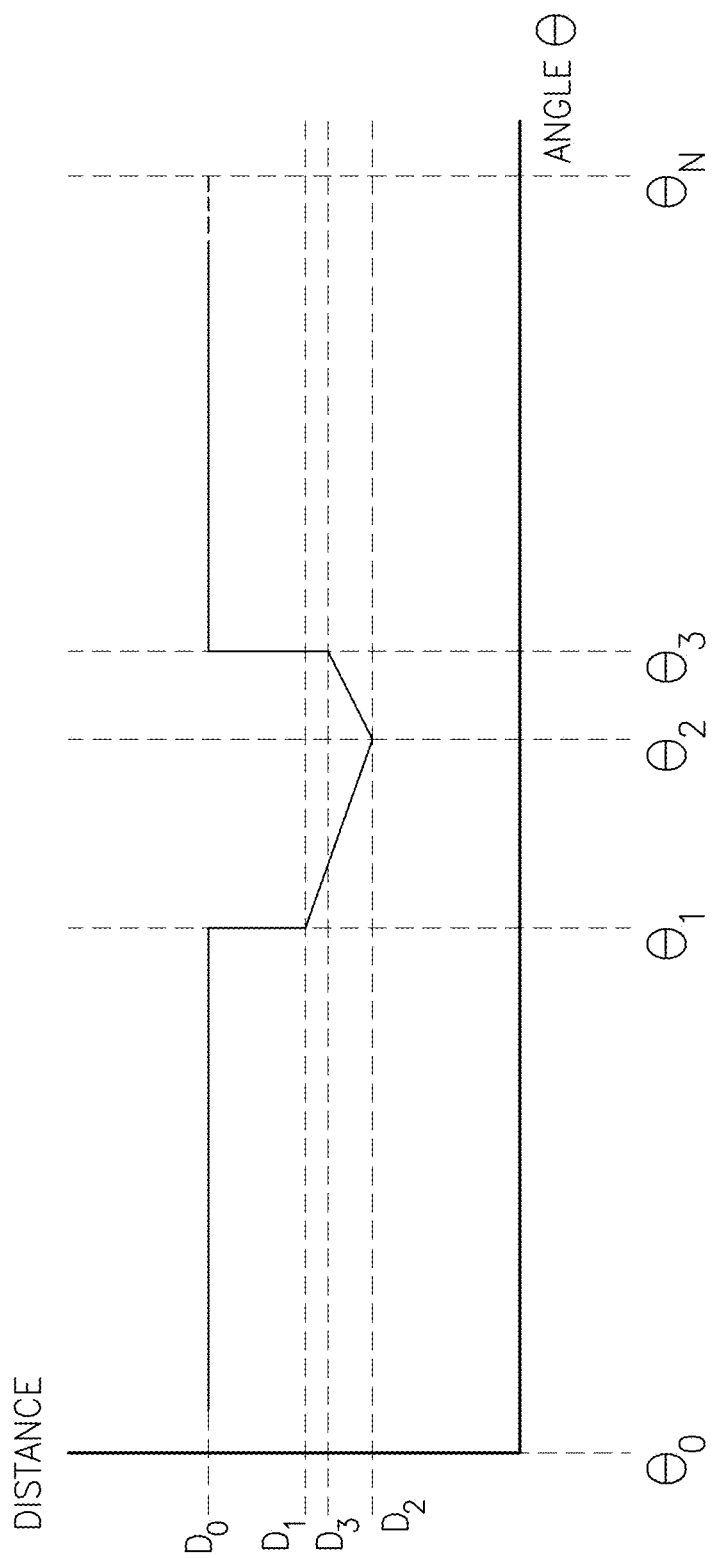

FIG. 1b is a plot of the ranging data output from the system 100 in FIG. 1a in a single sweep from left to right. The scan output of the distance scanning system 100 for the scan depicted in FIG. 1a is the plot shown in FIG. 1b, in which the first surface 112 and the second surface 114 are captured as reduced distances at specific angles of rotation.

The x-axis of the plot includes an angle $\theta$ that corresponds to a position on the rotation path 108. Thus, a left side of the plot in FIG. 1b represents the left side of the rotation path 108 in FIG. 1a and is denoted by $\theta_0$, a right side of the plot in FIG. 1b represents the right side of the rotation path 108 in FIG. 1a and is denoted by $\theta_N$, and a center of the plot in FIG. 1b represents the center of the rotation path 108 in FIG. 1a. A single scan or sweep of the area of interest will have a starting angle $\theta_0$, and an ending angle $\theta_N$. The system will take a series of distance measurements with the ranging sensor 109 along the path 108 and will generate a change in angle from a prior distance scan. The distance associated with each change in angle measurement is plotted in FIG. 1b.

As you move from the left side of the plot to the right side of the plot, the angle $\theta$ changes, which may increase or decrease linearly or according to any other function. A first measurement is taken at the starting angle $\theta_0$, which has a corresponding first distance measurement of $D_0$. In the environment of FIG. 1a, the distance $D_0$ can represent no distance detected, such that the system outputs a baseline value, such as associated with a time out (no object detected during the distance detection time period). The ranging sensor 109 has a limited distance measurement such as 2 meters to 10 meters. As the device 101 sweeps from the starting angle $\theta_0$ to the right, the system take periodic measurements of distance and changes in the angle. At a limit angle, which is an angle beyond a limit of rotation detectable by the rotation sensor 111, a change from no distance to a distance $D_0$ is detected. It is noted that the function representing the x-axis can be linear, discrete, logarithmic, or any other function. The x-axis is a representation of actual rotation angles, of relative rotation angles, of scaled rotation angles, or some other set of values.

The y-axis of the plot represents a distance that corresponds to the distance detected by the ranging sensor 109. Thus, a top side of the y-axis in FIG. 1b represents a far distance between the ranging sensor 109 and an obstruction in FIG. 1a or may represent no distance detected as the ranging sensor 109 may time out and not return a distance if no object is within the sensors detectable range. A bottom side of the y-axis in FIG. 1b represents a near distance between the ranging sensor 109 and an obstruction in FIG. 1a and a center of the plot in FIG. 1b represents a medium distance between the ranging sensor 109 and an obstruction in FIG. 1a. The y-axis can be linear, discrete, logarithmic, or set according to any other function. The y-axis is a representation of actual distance, of relative distance, of scaled distance, or some other set of values.

At a far left side of the plot shown in FIG. 1b at $\theta_0$, there is a starting distance value for the value of angle $\theta$. The lack of change of values can reflect no data received from the ranging sensor 109, an out-of-display-range value for the distance, or some other value. Alternatively, there is a distance value for every angle $\theta$.

The far left of the plot represents the starting angle $\theta_0$ associated with the first axis 106 of the device 101. The first angle $\theta_1$ represents a rotation angle around the first axis 106 of the distance scanning system 100 from the starting angle $\theta_0$. The distance values in a segment of rotation angle between a minimum angle $\theta$ with distance values and the first angle $\theta_1$ are shown at a constant and high distance value of distance $D_0$. The lack of changes in distance values can reflect no data received from the ranging sensor 109, an out-of-display-range value for the distance, or some other value. The high value may represent a measured distance of a curved wall (not shown) behind the object 110 such that a distance between the device and the wall is relatively constant. As the distance scanning system 100 is scanned from far left to the first angle $\theta_1$, the measured distance stays the same and is greater than a distance between the distance scanning system 100 and the object 110.

From the first angle $\theta_1$ to a second angle $\theta_2$, the distance is shown as decreasing. This is illustrated as two distance measurements with only two changes in angles of rotation, however, in operation, multiple distance measurements and multiple changes of rotation are collected to detect the surface 112 of the object. As the distance scanning system 100 rotates to the first angle $\theta_1$ from the left, the ranging sensor 109 starts to detect the first surface 112 of the object 110, which causes a drop in the distance detected to a distance $D_1$. Because the first surface 112 is not square to the ranging sensor 109, as the distance scanning system 100 rotates from the first angle $\theta_1$ to the second angle $\theta_2$, the distance changes, from $D_1$ to $D_2$. Due to the position of object 110 depicted in FIG. 1a, with a left edge of the first surface 112 being farther from the ranging sensor 109 than a right edge of the first surface 112, the distance at the first angle $\theta_1$ is less than the distance at the second angle $\theta_2$.

The change in distance between the first angle $\theta_1$ and the second angle $\theta_2$ is shown as approximately linear. Because of the scanning being completed by rotation around the first axis 106, a planar surface will not produce a perfectly linear scan across the surface. For instance, compared to a best fit linear response for the distance to the first surface 112, the response will appear as parabolic. The distance at the left edge of the first surface 112 will be higher than the distance at the same angle from a best fit linear response. The degree of non-linearity is dependent on factors such as size of the obstruction, position of the obstruction, and distance to the obstruction.

From the second angle $\theta_2$ to a third angle $\theta_3$, the distance is shown as increasing, from $D_2$ to $D_3$. As the distance scanning system 100 rotates to the second angle $\theta_2$ from the left, the ranging sensor 109 starts to detect the second surface 114 of the object 110. Because the second surface 114 is not square to the ranging sensor 109, as the distance scanning system 100 rotates from the second angle $\theta_2$ to the third angle $\theta_3$, the distance changes. Due to the position of object 110 depicted in FIG. 1a, with a left edge of the second surface 114 being nearer to the ranging sensor 109 than a right edge of the second surface 114, the distance at the second angle $\theta_2$ is greater than the distance at the third angle $\theta_3$.

The change in distance between the second angle $\theta_2$ and the third angle $\theta_3$ is shown as approximately linear. Similar to the scanning of the first surface 112, the plot of the distance will appear as parabolic.

At the third angle $\theta_3$ and the plot line of distance values returns to a value of distance $D_0$. The far right of the plot line from the third angle $\theta_3$ to a maximum angle $\theta$ with distance values represents a rotation angle around first axis 106 of the distance scanning system 100. The distance values in this segment of rotation angle are shown as the distance $D_0$.

At the far right side of the plot shown in FIG. 1b, there is an ending distance value for ending angle $\theta_N$. The lack of values can reflect no data received from the ranging sensor 109, an out-of-display-range value for the distance, or some other value. Alternatively, there may be no space on the right side of the plot in which there is no distance value for ending angle $\theta_N$.

In alternative scanning situations, the user may perform a series of sweeps where the maximum rotation of the device about the first axis 106 is in the range of 45 and 50 degrees as compared to the illustrated rotation range of 150 and 180 degrees. The system processes each sweep of the area of interest, a first sweep from left to right, a second sweep from right to left, and a third sweep from left to right, for example, and outputs a distance representation of the area of interest. This information can be used to output three-dimensional information, such as on the display. In alternatively embodiments, this three-dimensional information can be used in a virtual reality environment.

Figure 2:
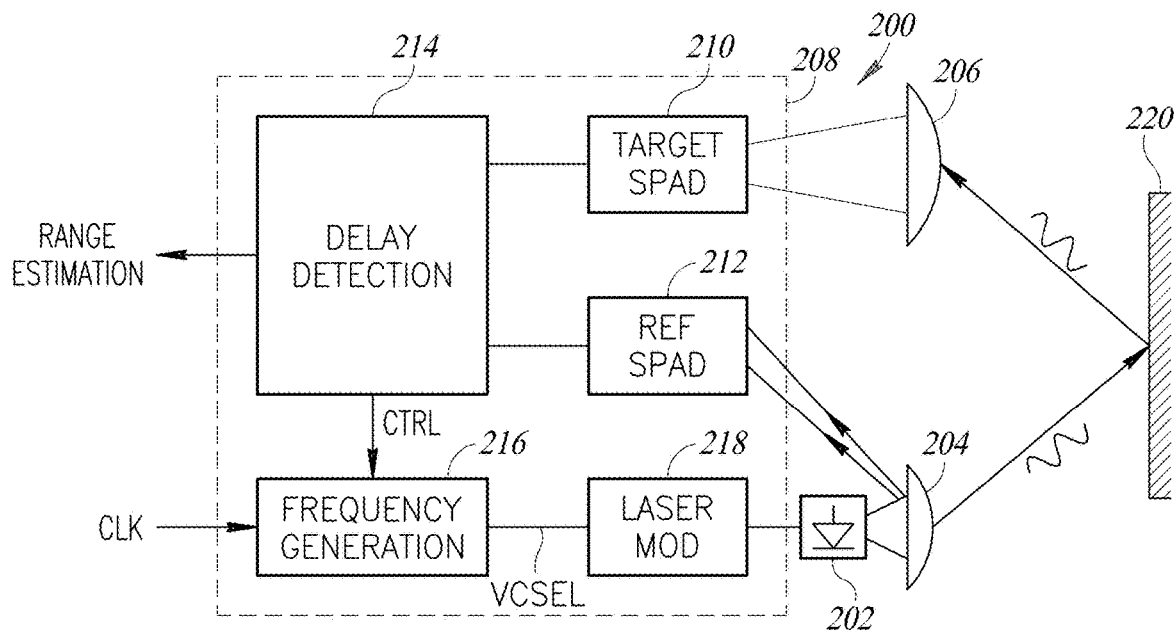
FIG. 2 is a schematic of a time of flight sensor in accordance with an embodiment of the present disclosure.

The distance measurements of the ranging sensor 109 can be achieved with a time of flight (ToF) ranging device, such as the TOF ranging device 200 of FIG. 2. Other types of ranging sensors can be incorporated, however, there are benefits to the ToF ranging sensor 200. This TOF sensor uses a time of return for a broadcast optical signal to calculate range or distance. The device 200 includes a light source 202 that generates an optical signal, such as a beam of optical pulses, transmitted into the image scene via a lens 204. The optical signal propagates into the space visible to the sensor and reflects off any surface. The reflection is in the opposite direction as the propagation of the light from the light source, as a return optical pulse. The return optical pulses are received via a further lens 206. The lenses 204 and 206 can be used to split the field of view of the ToF sensor to generate more than one distance per sensor per time interval.

The ranging device 200 uses a laser to transmit the optical pulse. The laser is a vertical cavity surface emitting laser (VCSEL) that transmits photons out into the area of interest. The TOF ranging device 200 includes a range estimation circuit 208 that includes a reference a single photon avalanche diode (SPAD) array 212 and a target SPAD array 210 to record received optical pulses and to estimate the distance between the device 200 and an object 220 in the image scene against which the optical pulses reflect. The reference and target SPAD array receive returned photons from the laser. The target SPAD array 210 receives the return optical pulses via the lens 206. The reference SPAD array (REF SPAD) 212, which is of the same dimensions or of smaller dimensions than the target SPAD array 210, and receives an internal reflection of the transmitted optical pulses.

A delay detection circuit (DELAY DETECTION) 214 is coupled to the target SPAD array 210 and to the reference SPAD array 212, and estimates the delay between each transmitted optical pulse and the return optical pulse received by the target SPAD array 210, in order to provide a range estimation (RANGE ESTIMATION) of the object 220. The range estimation circuit 208 also includes a frequency generation circuit (FREQUENCY GENERATION) 216, which generates a voltage signal VCSEL provided to a laser modulation circuit (LASER MOD) 218 for generating a signal for driving the light source 202. The delay detection circuit 214 provides a control signal CTRL to the frequency generation circuit 216 for controlling the period of the signal VCSEL.

The optical wavelength used for the optical pulse is invisible to the human eye. Various means can be used to split the field of view of the ToF sensor to generate more than one distance per sensor per time interval. For instance, mechanical lens pointing can be used to scan an area and produce multiple distance readings per time interval. Alternatively, an array of photosensors in the ranging sensor is positioned so that each photosensor receives a return optical signal from a different angle, allowing for multiple distance readings to be taken within the overall field of view of the ranging sensor 109. Thus a wide range of different sets of data can be produced by the different types of the ranging sensor 102.

Figure 3:
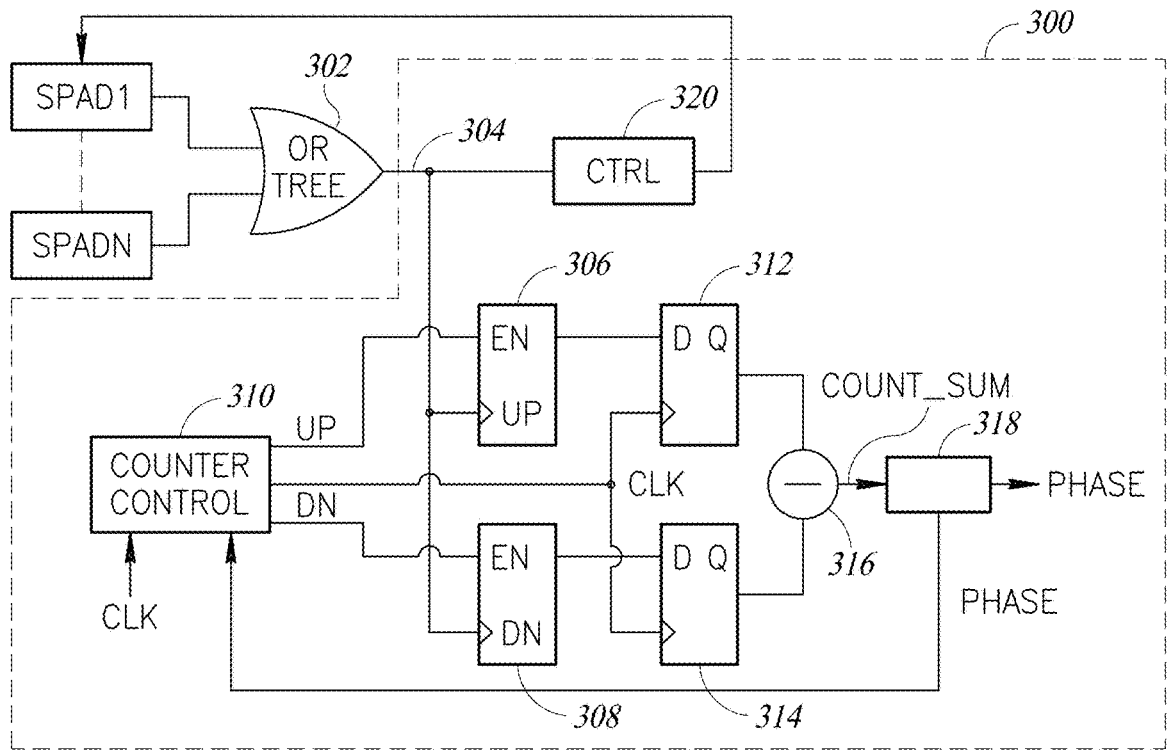
FIG. 3 is a schematic of a delay detection circuit of the time of flight sensor of FIG. 2.

FIG. 3 schematically illustrates a circuit 300 forming part of the delay detection circuit 214 of FIG. 2 in more detail according to one embodiment in which the outputs of all of the SPAD cells of the target SPAD array 210 are combined onto a single line. In particular, an OR tree (OR TREE) 302 has inputs respectively coupled to the output of each of the SPAD cells SPAD1 to SPADN of the target array 210, and provides, on its output line 304, pulses generated each time an event is detected by any of the SPAD cells. A control circuit 320 is coupled to the output line and to the SPAD array to control which one or more SPAD cell of the target SPAD array 210 is active.

The circuit 300 includes counters coupled to the output line 304 for counting the detected events. A clock signal CLK drives a counter control 310. The counter control in turn drives up counter (UP) 306 and down counter (DN) 308. The outputs of the counters are communicated to respective flip-flops 312 and 314, whose outputs are subtracted by subtraction unit 316 to produce a signal COUNT- _SUM. A phase detection circuit 318 compares the signal PHASE from the counter control 310 and the signal COUNT_SUM to determine timing of the signal and output the signal PHASE. The phase signal is also used to control the timing of the signals UP and DN, as will be described in more detail below.

While not illustrated in FIG. 3, the delay detection circuit 214 further includes a circuit similar to the circuit 300 for generating a reference phase signal PHASE' indicating the timing of the center of each optical pulse received by the reference SPAD array 212. The delay detection circuit 214 estimates the time of flight of the optical pulses based on the time difference between the phase signals PHASE and PHASE'.

The principles of the described circuit and method for calculating a distance to an object could be applied to arrays formed of other types of photon detection devices or other range detection devices.

Figure 4:
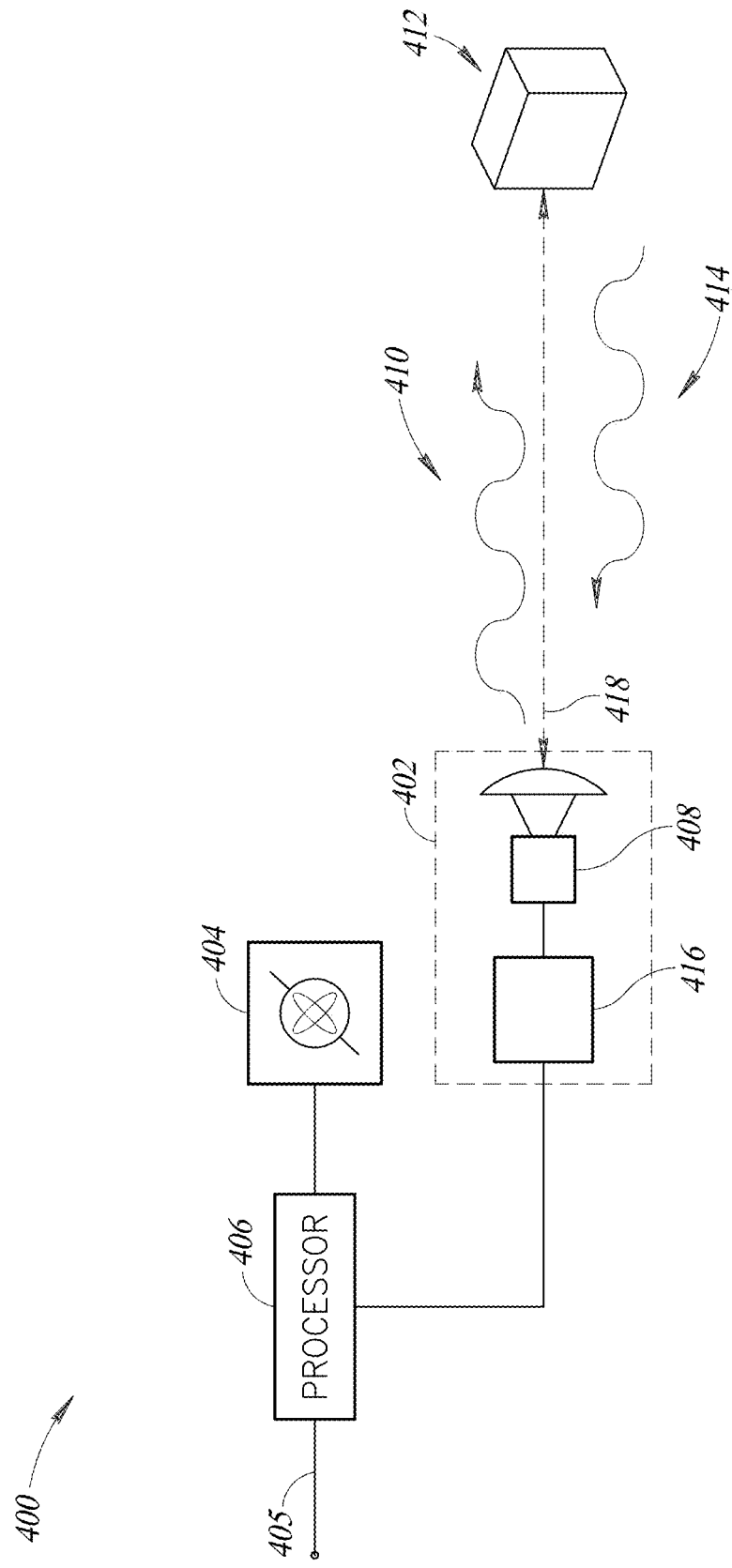
FIG. 4 is a schematic of a distance scanning system with a ranging sensor and a rotation sensor.

FIG. 4 is a schematic of a distance scanning system 400 with a ranging sensor 402, a rotation sensor 404, and a processor 406, according to one embodiment. This distance scanning system may be incorporated within a mobile device, such as the embodiment in FIG. 1A or may be a stand-alone system. The distance scanning system 400 is configured to detect distance and rotation, and associate these values according to various algorithms. The distance scanning system 400 may be a singular unit or may include components that are physically separated from each other. Alternatively, the distance scanning system 400 is not physically connected to any other electrical component, such as a mobile device. The ranging sensor 402 can be any ranging sensor discussed above.

The distance scanning system 400 also includes a rotation sensor 404. The rotation sensor 404 may be any type of device for converting rotation into an electrical signal representative of rotation angle. For example, the rotation sensor 404 can be a gyroscope that detects rotation. In another embodiment, the rotation sensor 404 relies on acceleration sensors that are paired to detect rotation from differences in detected acceleration. The rotation sensor 404 can also be an array of rotation sensors or a multi-axis rotation sensor. The rotation sensor 404 detects rotation, similar to the rotation of the distance scanning system 100 around the first axis 106. The electrical signal may use any means for storing the information about the detected rotation. For instance, the changes in rotation can be converted into a variable voltage signal or a varying current signal. The electrical signal from the rotation sensor 404 may be directly output, or may undergo signal conditioning at the rotation sensor 404 before being output. Examples of signal conditioning include signal amplification and signal noise reduction.

The processor 406 can be an application-specific integrated circuit (ASIC), a general purpose computer chip programmed to provide the functions discussed throughout this disclosure, or some other implementation. The processor 406 is coupled to the ranging sensor 402 and the rotation sensor 404 to receive the distance and rotation signals. The processor 406 can include memory that stores the data for later processing or can process the data in real time. The processor includes an output line 405 that transmits the data to another device or to a display.

To generate the ranging data, the ranging sensor 402 includes an optical sensor 408. The optical sensor 408 includes at least one of any number of optical devices, including a light-emitting diode and a single photon avalanche diode (SPAD). The optical sensor 408 can include more than one optical device, such as at least one signal generator and one signal detector. Other numbers of devices are also within the scope of the present disclosure, such as one signal generator and two signal detectors.

The optical sensor 408 generates a broadcast optical signal 410. The broadcast optical signal propagates away from the optical sensor 408. The broadcast optical signal 410 may be any type of optical signal, such as a laser signal. The laser signal may be narrowly focused or may use a lens to be widely spread. In addition, multiple laser signals may be generated in different directions, either with time division and a pointing mechanism, with multiple optical signals being generated, or with an optical signal being split into multiple signals.

The broadcast optical signal 410 is reflected off of an object 412. The object 412 is any kind of obstruction that the broadcast optical signal 410 will be reflected off of. For example, the object 412 can be similar to the object 110 as described with respect to FIG. 1a.

The reflection of the broadcast optical signal 410 off of the object 412 is a return optical signal 414. The return optical signal 414 is a portion of the broadcast optical signal 410 that is reflected so that the signal returns along a same optical path that it propagated out from the optical sensor 408 on, but in the opposite direction. Other portions of the broadcast optical signal 410 may not be reflected by the object, or may reach the object, but not be reflected along the same optical path.

The return optical signal 414 is detected at the optical sensor 408. As discussed above, the optical sensor 408 may include a device such as a SPAD. The SPAD generates an electrical signal when the optical sensor 408 receives photons from the return optical signal.

The time of detection of the return optical signal 414 is determined by a range estimation circuit 416. The range estimation circuit then compares the time of generation of the broadcast optical signal 410 to the time of detection of the return optical signal 414. Time of generation is subtracted from the time of detection to get a time duration between generation and detection of the signals. If the speed of the signals is known, then the speed can be multiplied by the time duration to get a distance. The distance can then be divided by two to account for the propagation distance and the return distance both being included. This gives the absolute distance D between the optical sensor 408 and the object, such as the user 108. Alternatively, the time duration is compared to time durations representing the detection range of the sensor to assign an arbitrary scaled value to the time duration.

The optical sensor 408 and the range estimation circuit 416 can be part of a singular device that is the ranging sensor 402. Alternatively, the optical sensor 408 and the range estimation circuit 416 are physically separated components of a system that is the ranging sensor 402. The output of the range estimation circuit 416 is the output of the ranging sensor 402 of the ranging data. The processor 406 associates the received distance data from the ranging sensor 402 with the corresponding rotation data from the rotation sensor 404. The processor 406 associates the distance data with the rotation data based on when the data was received by the processor 406. Alternatively, one or both of the data values comes with a time stamp that the processor reads to match to other data values. The associated data is output by the processor in any number of forms and using any number of communication protocols. For example, the associated data can be output as a data array over a serial unidirectional port. Alternatively, the associated data can be output as a table of data over a parallel bidirectional port. Alternatively, the processor can provide the drive signals to both the ranging sensor and the rotation sensor to correlate the distance measurement with the change in angle.

Figure 5:
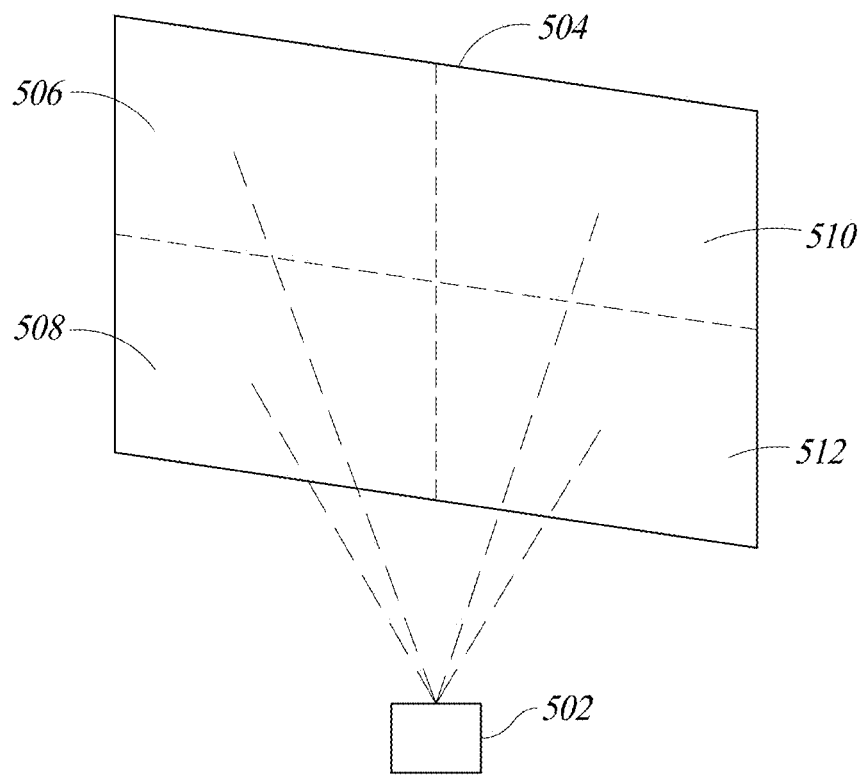
FIG. 5 is a perspective view of a ranging sensor having multi-zone detection and value outputs.
Figure 5:
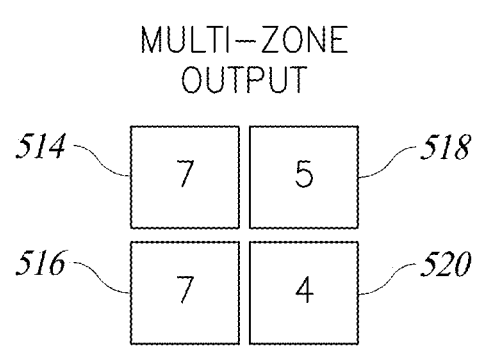

FIG. 5 is one embodiment of the ranging sensor of FIGS. 2-4 having multi-zone detection and value outputs. The ranging sensor 502 can detect multiple distances in a single distance detection step. This allows the ranging sensor to detect wall that is angled with respect to the ranging sensor. The ranging sensor 502 has a field of view 505 that is directed towards a wall 504 that has an angled planar surface (with a normal vector that is not parallel to a normal vector from the lens of the ranging sensor 502). Thus, different sections of the wall 504 are at different distances from the ranging sensor 502.

In FIG. 5, the ranging sensor 502 has a SPAD array with a 4-zone detection capability which can output a different distance for each zone giving the ranging sensor more robust detection capabilities. Other numbers of zones for zone detection capability are possible (e.g., 9-zone, 12-zone, and 16-zone). The zones are equal to numbers of diodes within the SPAD array. The zones can be any shape based on the specific design of the ranging sensor 502, including arrangement of the photon detection cells in an array. The zones each correspond to a plurality of cells in the array of ranging sensors. A first zone detection 506 in the field of view 505 corresponds to a top left corner of the wall 504 and is associated with a first portion 514 of the SPAD array. A second zone detection 508 corresponds to a bottom left corner of the wall 504 and is associated with a second portion 516 of the SPAD array. A third zone detection 510 corresponds to a top right corner of the wall 504 and is associated with a third portion 518 of the SPAD array. A fourth zone detection 512 corresponds to a bottom right corner of the wall 504 and is associated with a fourth portion 520 of the SPAD array.

Each of the four zones determines the distance to the respective zone of the obstruction 504 from the ranging sensor 502. The zones are fixed with respect to the ranging sensor 502. The wall 504 is angled with respect to the lens of the ranging sensor 502, so the different zones detect different differences, i.e., they do not have a uniform value for detected distance to the obstruction 504. For example, the first and second portions 514, 516 detect a distance of 7. The third portion 518 detects a distance of 5. The fourth portion 520 detects a distance of 4. In a single distance measurement, four distance values are output by the ranging sensor.

The decreasing values from the first and second zone distances 514, 516 to the third and fourth zone distances 518, 520 reflect how the left side of the obstruction 504 is farther from the ranging sensor 502 than the right side of the obstruction 504. Additionally, the difference between the third zone distance 518 and the fourth zone distance 520 reflects how the top right corner of the obstruction 504 is farther from the ranging sensor 502 than the bottom right corner.

The values for the zone distances 514, 516, 518, 520 can be a true distance (e.g., 7 represents 7 units of measurement such as 7 centimeters). Alternatively, the value of 7 represents a normalized distance (e.g., a 7 out of 10 with 10 representing the maximum detection distance of the ranging sensor 502 and 0 representing the minimum detection distance of the ranging sensor 502. The value of 7 can also represent a different unit of measure, such as time. The other zones are any of the different data types discussed. These values can be output from the ranging device on separate output paths, which are received by the processor. Alternatively, there may be a single output terminal where the different outputs can be interpreted by the processor.

With multi-zone detection capability, it is possible to implement various data blending schemes to improve scanning, among other benefits. For example, a scan can be taken by the distance scanning system 100 having the ranging sensor 502 with multi-zone detection capability. The distance scanning system 100 is then rotated such that the first zone detection 506 overlaps the third zone detection 510 and the second zone detection 508 overlaps the fourth zone detection 512. The distance detection system 100 determines that the zones partially overlap by analyzing data from a rotation sensor. Then the distance detection system 100 compares the overlapping measurements and adjusts a distance offset so that the overlapping zones are normalized to one another or are equal. This process continues as the distance scanning system 100 continues to rotate during scanning, stitching the data together. The data stitching helps compensate for system errors, such as from translational movement of the distance scanning system 100 off of the rotation reference point 104.

Other methods can be used to compensate for system errors, such as from the use of a position sensor to detect translational movement of the ranging sensor 502. The position sensor is an absolute position sensor, a relative position sensor, an accelerometer, or any other sensor that can directly or indirectly detect changes in position. By knowing the translational movement, the ranging data can be adjusted to compensate for the errors generated by moving off of the various reference points or axes.

Figure 6A:
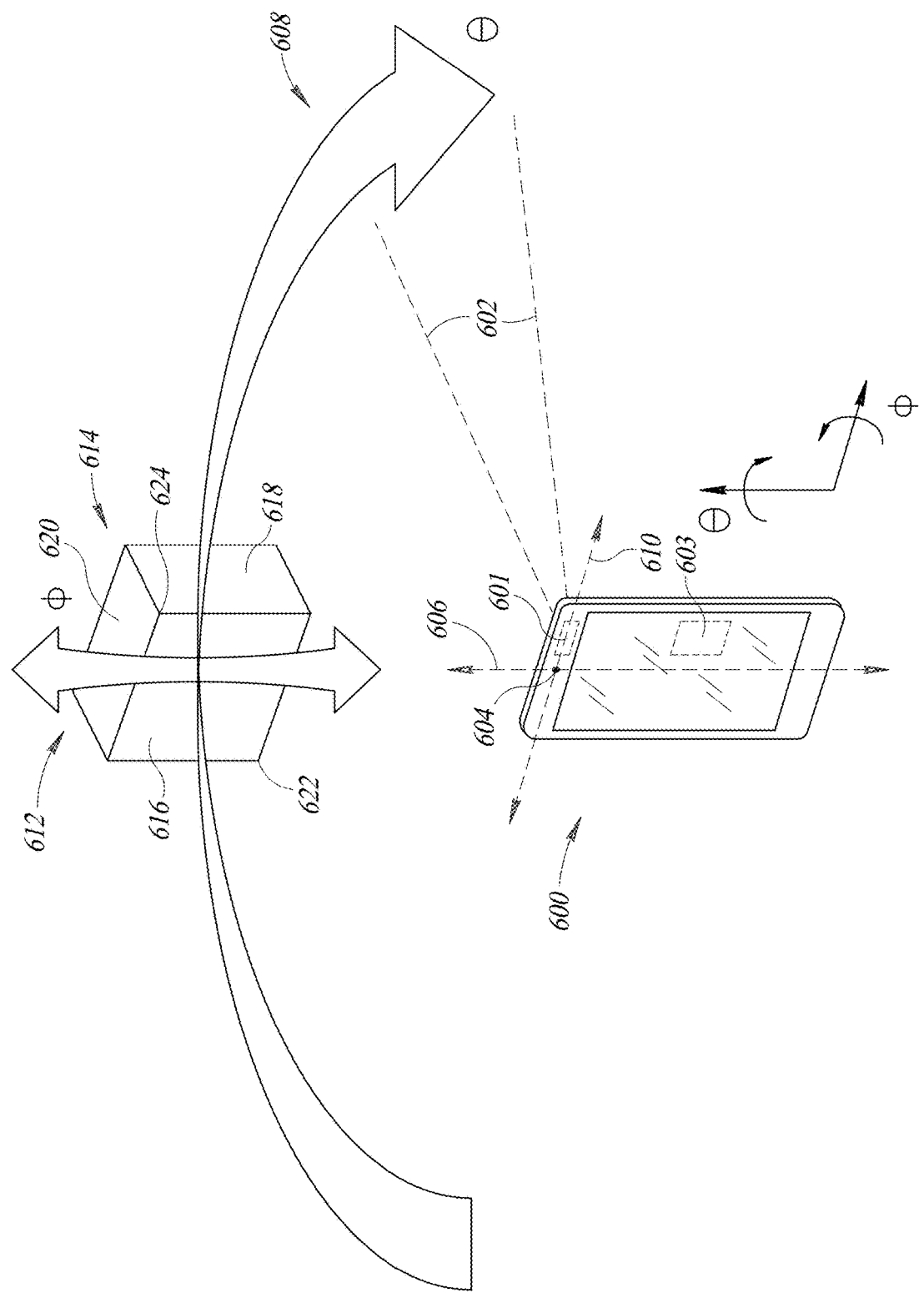
FIGS. 6a-6c are views of an object scanning system and resulting data plots for a ranging device and a rotation sensor.

FIG. 6a is a distance scanning system 600 for scanning an object or environment according to an embodiment of the present disclosure. The distance scanning system 600 includes a ranging sensor 601 that has a field of view 602. The ranging sensor detects distances from the ranging sensor 601 to an obstruction in the field of view 602. A center of the ranging sensor 601 is fixed with respect to a rotation reference point 604, which corresponds to an intersection of a first reference axis 606 and a second reference axis 610.

To measure rotation around the rotation reference point 604, the distance scanning system 600 includes a rotation sensor 603. The rotation sensor 603 detects rotation around at least two axes, including the first and second reference axes 606, 610. The rotation sensor 603 is fixed with respect to the ranging sensor 601. At a start of a scan, the system can perform a calibration step to determine an offset of the rotation sensor with respect to the first and second axes.

The distance scanning system 600 can detect distances and rotation associated with both the first and second reference axis 606, 610. As the field of view 602 of the ranging sensor scans along the rotation paths 608, 612 (left-right and up-down), the field of view 602 passes over an object 614. The object 614 has a first surface 616, a second surface 618, and a third surface 620. Additionally, the object 614 has a first vertex 622 and a second vertex 624. The first vertex 622 is depicted as the furthest visible vertex from the distance scanning system 600, while the second vertex 624 is depicted as the nearest visible vertex from the distance scanning system 600.

Figure 6B:
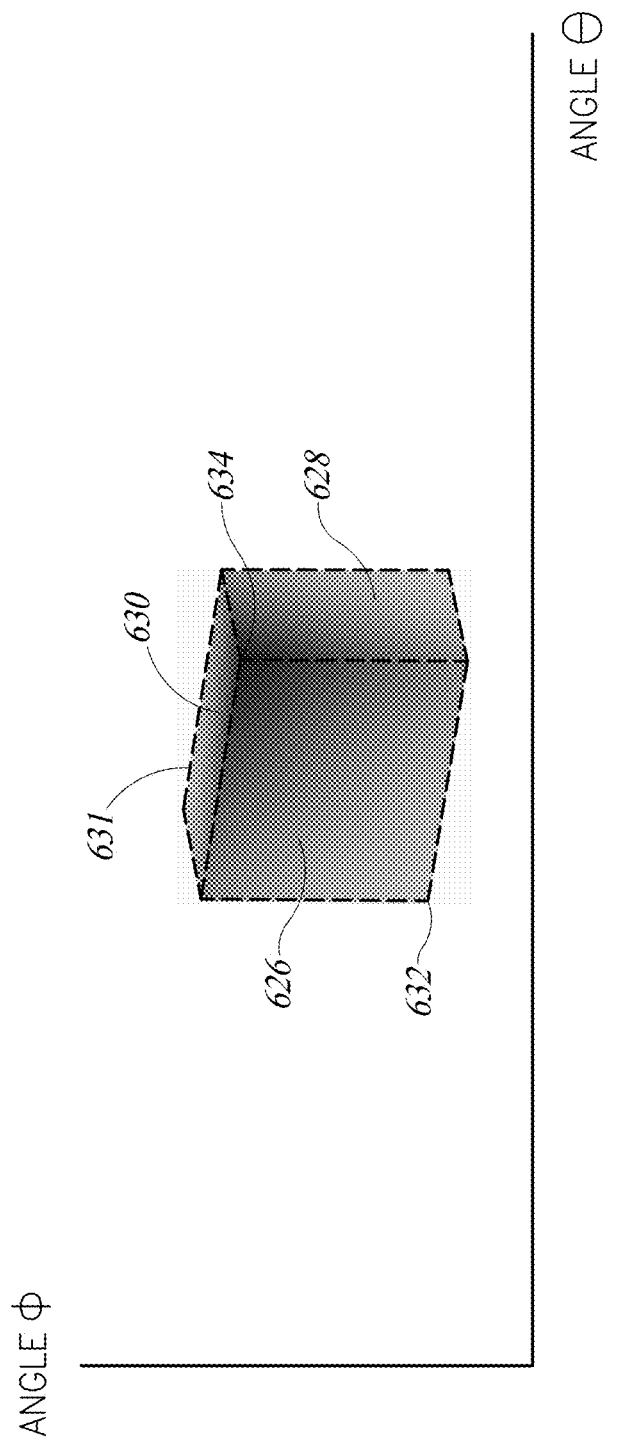

FIG. 6b is a plot of the ranging data collected from a scanning of the object by the device in FIG. 6a. The first surface 616, the second surface 618, and the third surface 620 are captured as a relief map with shading representing detected distance. In addition, an outline of the object 614 is shown in the plot with a dashed line.

The x-axis of the plot includes an angle θ that corresponds to the rotation path 608 (left to right). The y-axis of the plot includes an angle φ that corresponds to the rotation path 612 (up and down). The x-y plot includes distance values that correspond to the distances detected by the ranging sensor as a function of the angle θ and the angle φ. The distances are represented in FIG. 6b by shading, with lighter shading being farther away and darker shading being closer to the ranging sensor.

A first surface 626 depicted in the x-y plot corresponds to the first surface 616 of the object 614. A second surface 628 depicted in the x-y plot corresponds to the second surface 618 of the object 614. A third surface 630 depicted in the x-y plot corresponds to the third surface 620 of the object 614.

Additionally, data in the x-y plot is shown having a first vertex 632 and a second vertex 634. The first vertex 632 is shown at a bottom left corner of the first surface 626. The second vertex 634 is shown at an intersection of the first surface 626 with the second surface 628 and the third surface 630. The first vertex 632 is depicted as the furthest visible vertex from the distance scanning system 600 by being shaded the lightest, while the second vertex 634 is depicted as the nearest visible vertex from the distance scanning system 600 by being shaded the darkest.

At a left edge of the first surface 626, the distance is shown as decreasing. As the distance scanning system 600 rotates from a left edge of the first surface 616 to a right edge of the first surface 616, the ranging sensor detects a distance to a plurality of points on the first surface 616 and displays those distances as shading on the first surface 626. In addition, as the distance scanning system 600 scans from the left edge of the first surface 616 to the right edge of the first surface 616, the distance scanning system 600 may also be scanning the third surface 620. As the distance scanning system 600 rotates from a left edge of the third surface 620 to a right edge of the third surface 620, the ranging sensor detects a distance to a plurality of points on the third surface 620 and displays those distances as shading on the third surface 630. In addition, as the distance scanning system 600 rotates from a left edge of the second surface 618 to a right edge of the second surface 618, the ranging sensor detects a distance to a plurality of points on the second surface 618 and displays those distances as shading on the second surface 628.

The change in distance across each one of the first surface 626, the second surface 628, and the third surface 630 is shown as approximately planar. Because of the scanning being completed by rotation around the first axis 606 and the second axis 610, a planar surface of the object 614 will not produce a perfectly planar scan across the surface. For instance, compared to a best fit planar response for the distance to the first surface 626, the response will appear curved. The distance at the left edge of the first surface 626 will be higher than the distance at the same angle from a best fit planar response. The degree of deviation from the plane is dependent on factors such as size of the obstruction, position of the obstruction, and distance to the obstruction.

Between the far right of the plot and a right edge of the second surface 628 shown in FIG. 6b, there are no distance values for the values of angle θ at any value of angle φ. The lack of values can reflect no data received from the ranging sensor, an out-of-display-range value for the distance, or some other value. Alternatively, there may be no space on the right side of the plot in which there is no distance value for angle θ for any value of φ.

Figure 6C:
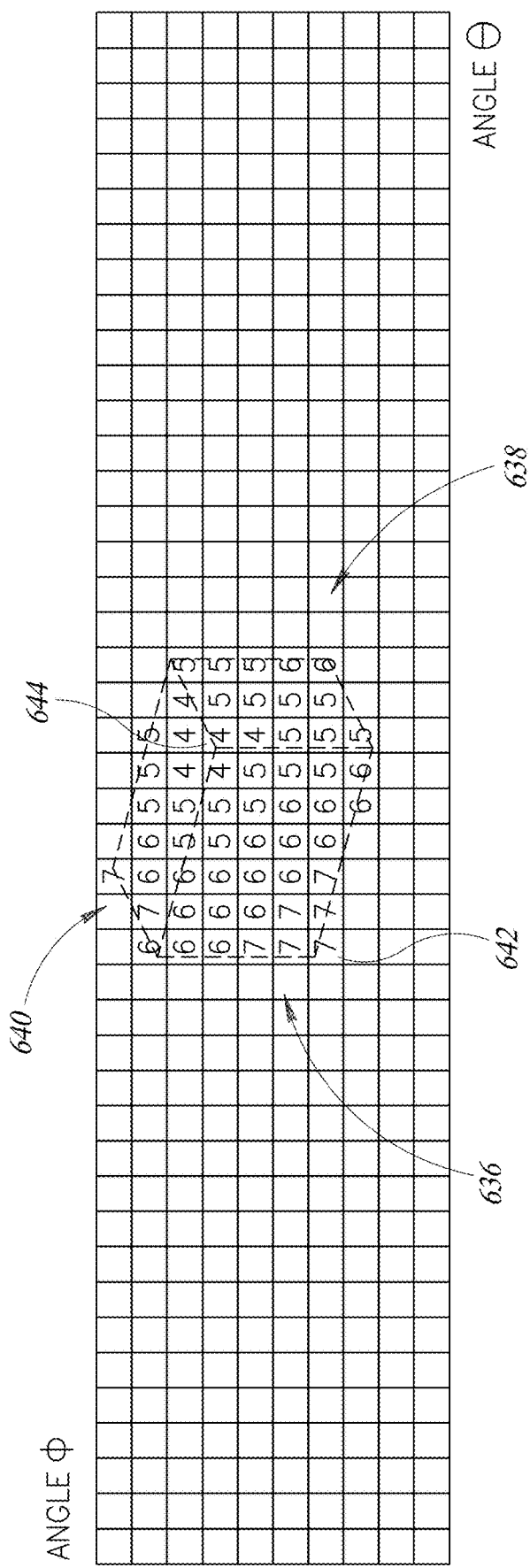

FIG. 6c is another embodiment of a plot of the ranging data collected in FIG. 6a. The table shown in FIG. 6c presents the distances detected in the sweep shown in FIG. 6a as a table of values. In addition, an outline of the object 614 is shown in the plot with a dashed line.

The x-axis and the y-axis are similar to those described with respect to the plot shown in FIG. 6b. Similarly, the blank values on the left and right sides of the table in FIG. 6c are similar to those described with respect to the plot shown in FIG. 6b.

In contrast to the plot shown in FIG. 6b, the table shown in FIG. 6c includes distance values that correspond to the distances detected by the ranging sensor as a function of the angle θ and the angle φ. The larger numbers represent distances farther away from the ranging sensor and lower numbers represent distances closer to the ranging sensor.

A first surface 636 corresponds to the first surface 616 of the object 614. A second surface 638 corresponds to the second surface 618 of the object 614. A third surface 640 corresponds to the third surface 620 of the object 614.

Additionally, data in the table is shown having a first vertex 642 and a second vertex 644. The first vertex 642 is shown at a bottom left corner of the first surface 636. The second vertex 644 is shown at an intersection of the first surface 636 with the second surface 638 and the third surface 640. The first vertex 642 is depicted as the furthest visible vertex from the distance scanning system 600 by having the highest number value, while the second vertex 644 is depicted as the nearest visible vertex from the distance scanning system 600 by having the lowest number value.

At a left edge of the first surface 636, the distance is shown as decreasing. As the distance scanning system 600 rotates from a left edge of the first surface 616 to a right edge of the first surface 616, the ranging sensor detects a distance to a plurality of points on the first surface 616 and displays those distances as a plurality of values for the first surface 636. In addition, as the distance scanning system 600 scans from the left edge of the first surface 616 to the right edge of the first surface 616, the distance scanning system 600 may also be scanning the third surface 620. As the distance scanning system 600 rotates from a left edge of the third surface 620 to a right edge of the third surface 620, the ranging sensor detects a distance to a plurality of points on the third surface 620 and displays those distances as a plurality of values for the third surface 640. In addition, as the distance scanning system 600 rotates from a left edge of the second surface 618 to a right edge of the second surface 618, the ranging sensor detects a distance to a plurality of points on the second surface 618 and displays those distances as a plurality of values for the second surface 638.

The representation of values using discrete values for distances is one of a number of various numbering schemes that can be used. These distances can represent actual distance, relative distance, scaled distance, or some other set of values. Additionally, these values can represent averages, maximums, minimums, or any other function of the ranges detected by the ranging sensor. The discrete values can be more dense (e.g., represent a smaller range of angles) or less dense than shown.

Figure 7A:
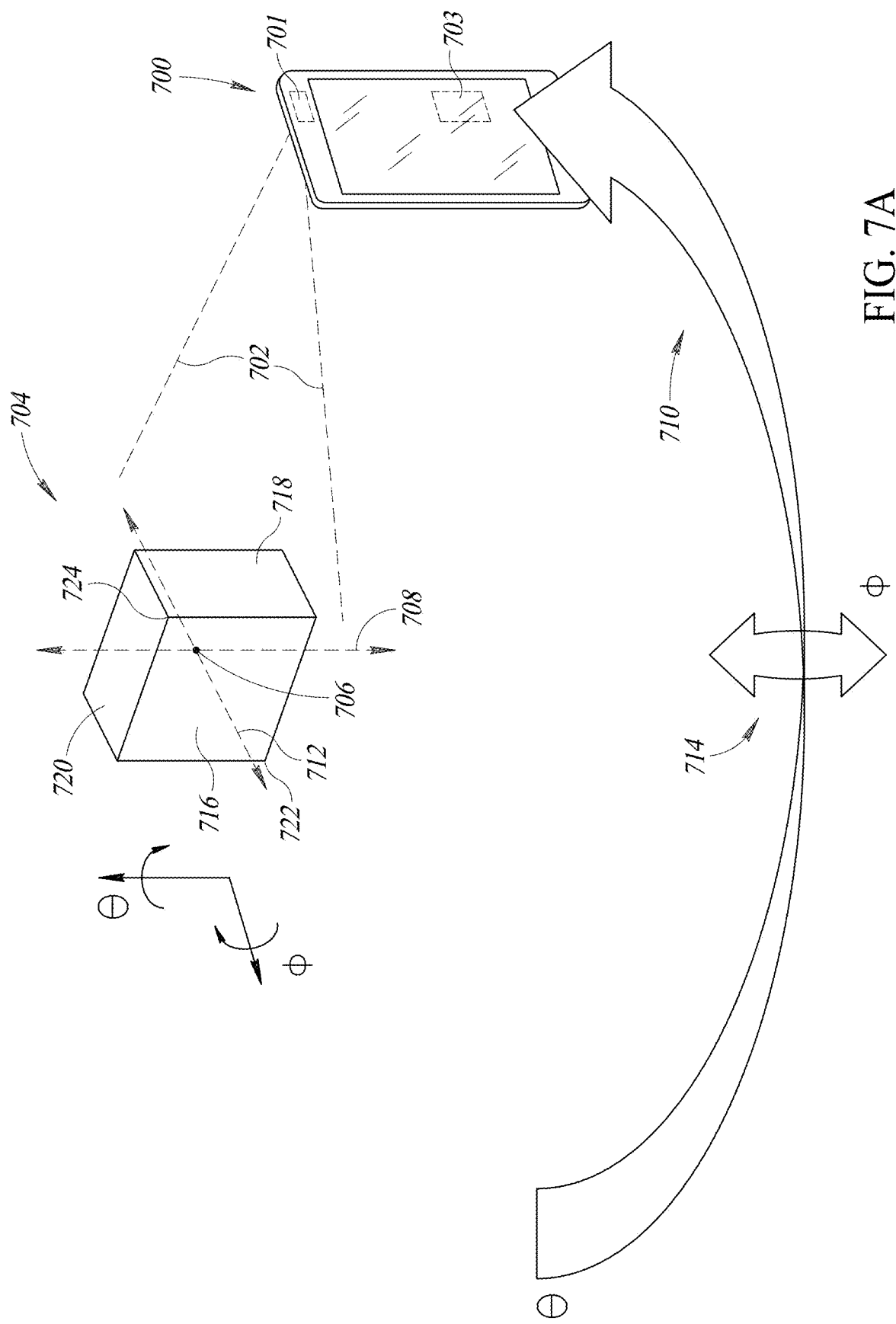
FIGS. 7a-7b are views of an object scanning system of the present disclosure.

FIG. 7a is a distance scanning system 700 is a device for scanning an object or environment. The distance scanning system 700 includes a ranging sensor 701 that has a field of view 702. The ranging sensor detects distances from the ranging sensor 701 to an object 704 in the field of view 702. A center of the ranging sensor 701 is set at a fixed distance with respect to a rotation reference point 706, which corresponds to an intersection of a first reference axis 708 and a second reference axis 712.

To measure rotation around the rotation reference point 706, the distance scanning system 700 includes a rotation sensor 703. The rotation sensor 703 detects rotation around at least two axes, including the first and second reference axes 708, 712. The rotation sensor 703 is fixed with respect to the ranging sensor 701. At a start of a scan, the system can perform a calibration step to determine an offset of the rotation sensor with respect to the first and second axes.

The distance scanning system 700 rotates along a rotation path 710 (left-right) and a rotation path 714 (up-down) corresponding to the first and second reference axes 708, 712, respectively, while keeping the field of view pointed at the rotation reference point 706 to scan surfaces of the object 704. The object 704 is shown having a first surface 716, a second surface 718, and a third surface 720. Additionally, the object 714 is shown with a first vertex 722 and a second vertex 724. The first vertex 722 is depicted as the furthest visible vertex from the distance scanning system 700, while the second vertex 724 is depicted as the nearest visible vertex from the distance scanning system 700.

Figure 7B:
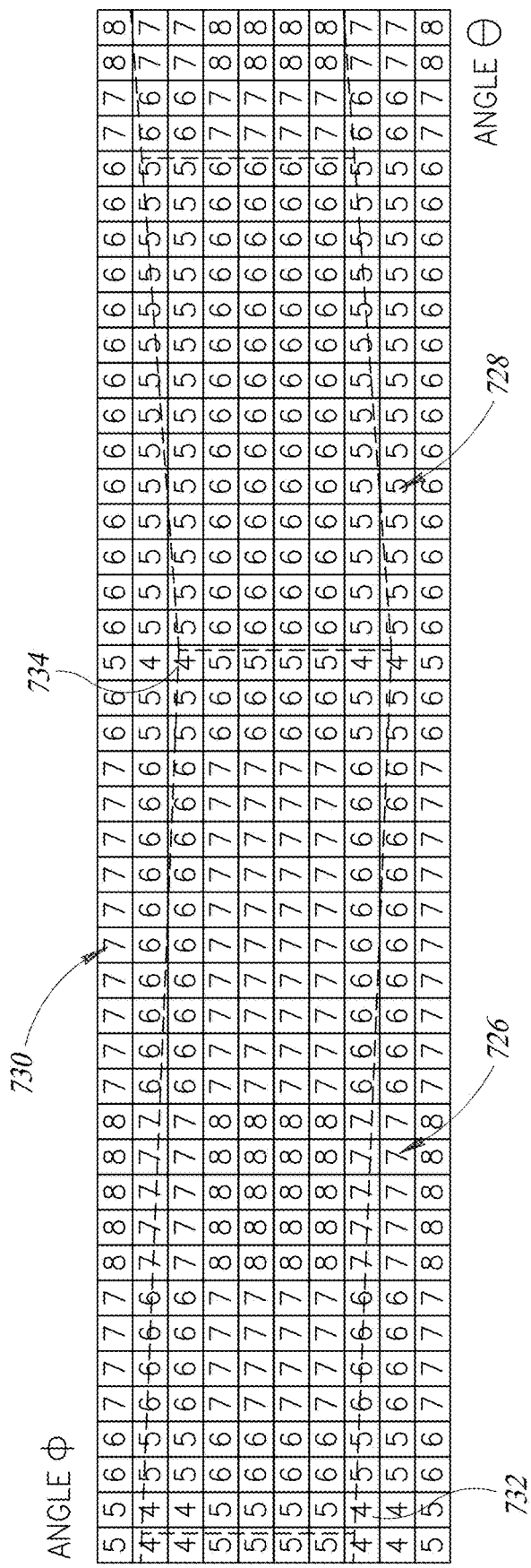

FIG. 7b is a plot of the ranging data collected from a scanning of the object by the device in FIG. 7a. The table shown in FIG. 7b presents the distances detected in the sweep shown in FIG. 7a as a table of values. In addition, an outline of the object 614 is shown in the plot with a dashed line. The x-axis and the y-axis are similar to those described with respect to the plot shown in FIGS. 6a and 6b, except with the rotation around different axes.

Like the table shown in FIG. 6c, the table shown in FIG. 7c includes distance values that correspond to the distances detected by the ranging sensor as a function of the angle θ and the angle φ. The larger numbers represent distances farther away from the ranging sensor and lower numbers represent distances closer to the ranging sensor.

A first surface 726 corresponds to the first surface 716 of the object 704. A second surface 728 corresponds to the second surface 718 of the object 704. A third surface 730 corresponds to the third surface 720 of the object 704.

Additionally, data in the table is shown representing a first vertex 732 and a second vertex 734. The first vertex 732 represents a range to the vertex 722, and is shown at a bottom left corner of the first surface 726. The second vertex 734 represents a range to the second vertex 724, and is shown at an intersection of the first surface 726 with the second surface 728 and the third surface 730. The first vertex 722 is depicted as the furthest visible vertex from the distance scanning system 700 in FIG. 7a, but as the distance scanning system 700 rotates around, the distance to the first vertex 722 decreases. When the first vertex 722 comes into the field of view 702, it has a short relative distance to the ranging sensor at that angle θ, so the first vertex 732 is given the lowest numbering value accordingly. Similarly, the second vertex 724 is also closer to the ranging sensor than other adjacent areas on the object 704. When the second vertex 724 comes into the field of view 702, it has a short relative distance to the ranging sensor at that angle θ, so the second vertex 734 is given the lowest numbering value accordingly.

As the distance scanning system 700 rotates from a left edge of the first surface 716 to a right edge of the first surface 716, the ranging sensor detects a distance to a plurality of points on the first surface 716 and displays those distances as a plurality of values for the first surface 726. As the distance scanning system 700 rotates from a left edge of the third surface 720 to a right edge of the third surface 720, the ranging sensor detects a distance to a plurality of points on the third surface 720 and displays those distances as a plurality of values for the third surface 730. In addition, as the distance scanning system 700 scans from a left edge of the second surface 718 to a right edge of the second surface 718, the ranging sensor detects a distance to a plurality of points on the second surface 718 and displays those distances as a plurality of values for the second surface 728. Because the rotation around the rotation reference point 706 at the center of the object 704, as the distance scanning system 700 rotates, the distance decreases at the edges of the planar surfaces and increases at a center of the planar surfaces.

The distance scanning systems discussed above can be used to enable various technological improvements. For example, in one embodiment, the distance scanning system is positioned on the end of a cane for use by the visually impaired or blind. As the cane is rotated, the distance scanning system detects distances and populates a matrix of distance values. This matrix of distance values can be used to detect hazards. In another embodiment, the distance scanning system can be used as a portable personal scanner for building 3d models of objects such as toys. A videogame could incorporate a 3d model of a scanned real world object scanned using the distance scanning system. In another embodiment, a self-navigating vacuum cleaner could incorporate a distance scanning system to aid in building a model of obstructions in a room to be cleaned.

Throughout present disclosure the embodiments are described with scanning in certain directions; however, the present disclosure is not limited by scanning in any one direction or in any one order. Additionally, the generating of a relief map or of a table of distance values are only exemplary types of receiving, storing, transmitting, or presenting the distance data, and other ways are also included. The distance data can be transmitted for use by other systems or used by any one of the distance scanning systems to generate a three-dimensional model.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
a frame;
a ranging sensor on the frame;
a rotation sensor on the frame and fixed with respect to the ranging sensor; and
a processor coupled to the ranging sensor and the rotation sensor, the processor outputs, in operation, a depth model in response to outputs from the ranging sensor and the rotation sensor, the depth model including first rotation data of the rotation sensor and first distance data of the ranging sensor and second rotation data of the rotation sensor and second distance data of the ranging sensor, the first distance data being a function of the first rotation data, the second distance data being a function of the second rotation data;

wherein the ranging sensor is a multi-zone ranging sensor that outputs a plurality of distance measurements for a single optical pulse, the first distance data includes a first plurality of distance measurements of a first plurality of zones, the second distance data includes a second plurality of distance measurements of a second plurality of zones; and wherein the processor determines that the second plurality of zones partially overlap the first plurality of zones based on the first rotation data and the second rotation data, and adjusts one or more of the first distance data or the second distance data based on the determining that the second plurality of zones partially overlap the first plurality of zones.

2. The system of claim 1 wherein the processor, in operations, sends a polling signal to the ranging sensor and the rotation sensor, and the ranging sensor and the rotation sensor transmit the first distance data and the first rotation data, respectively, to the processor in response to the polling signal.

3. The system of claim 1 wherein the rotation sensor, in operation, transmits the first rotation data that includes a first rotation around a first axis and a second rotation around a second axis, the second axis orthogonal to the first axis, the first distance data being a function of the first rotation and the second rotation.

4. The system of claim 1 wherein the depth model includes third distance data, the third distance data being a function of the first rotation data, second distance data being a function of the second rotation data and the third distance data.

5. The system of claim 1, further comprising:
a position sensor on the frame, fixed with respect to the ranging sensor, and coupled to the processor, the depth model including position data, the first distance data being a function of the position data.

6. The system of claim 1, further comprising:
a mobile device, the frame being within the mobile device, the mobile device including an interactive display.

7. A method, comprising:
scanning an area of interest with a hand-held device, the scanning including:
determining a first distance from a ranging sensor to an object at a first orientation, the ranging sensor being a multi-zone ranging sensor that outputs multiple distance measurements for a single optical pulse, the first distance including a first plurality of measurement data of a first plurality of zones;
rotating the ranging sensor around a first axis to a second orientation;
detecting a first change in angle from the first orientation to the second orientation with respect to the first axis; and
determining a second distance from the ranging sensor to the object at the second orientation, the second distance including a second plurality of measurement data of a second plurality of zones;
determining that the first plurality of zones partially overlap the second plurality of zones based on the first change in angle;
adjusting one or more of the first distance or the second distance based on measurement data of overlapping zones; and outputting the first distance with a first angle and the second distance with a second angle equal to the first angle plus the first change in angle.

8. The method of claim 7, further comprising:
rotating the ranging sensor around a second axis to the second orientation, the second axis being orthogonal to the first axis;
detecting a second change in angle from the first orientation to the second orientation with respect to the second axis; and
outputting the first distance with a third angle and the second distance with a fourth angle equal to the third angle plus the second change in angle.

9. The method of claim 7, further comprising:
displaying a relief map of the object in response to the scanning, the displaying including representing the first distance as a first shading and the second distance as a second shading, a distance between the depicting the first distance and the depicting the second distance on the relief map based on the amount of rotation of the ranging sensor around the first axis.

10. The method of claim 7, further comprising:
generating a three-dimensional model based on the first distance, the second distance, and the first change in angle.

11. The method of claim 7, further comprising:
determining a translational movement of the ranging sensor; and
adjusting the second distance based on the translational movement.

12. The method of claim 7, further comprising:
determining a third distance from the ranging sensor to the object at the first orientation;
comparing the second distance to the third distance; and
adjusting the second distance based on the comparing the second distance to the third distance.

13. The method of claim 7 wherein the first axis intersects a target object.

14. A system, comprising:
a ranging sensor operable to output a distance in response to an optical pulse;
a rotation sensor fixed with respect to the ranging sensor, the rotation sensor operable to output a rotation angle; and
a processor coupled to the ranging sensor and the rotation sensor, the processor receives, in operation, the distance and the rotation angle and outputs the distance with the rotation angle;
wherein the processor is operable to generate a polling signal, the ranging sensor is a multi-zone ranging sensor operable to output a plurality of distances in response to an optical pulse and the polling signal, and the rotation sensor is operable to output the rotation angle in response to the polling signal;
wherein the plurality of distances includes a first plurality of distances and a second plurality of distances, the rotation angle includes a first rotation angle and a second rotation angle, the first plurality of distances corresponding to the first rotation angle and the second plurality of distances corresponding to the second rotation angle; and
wherein the processor is operable to calibrate the plurality of distances or the rotation angle based on analyzing the a first plurality of distances and the first rotation angle with respect to the second plurality of distances and the second rotation angle.

15. The system of claim 14 wherein the ranging sensor is a time-of-flight laser ranging sensor.

16. The system of claim 14 wherein the each of the first rotation angle and the second rotation angle include a rotation angle measured around a first axis and a rotation angle measured around a second axis, the second axis orthogonal to the first axis.

17. The system of claim 14, further comprising:
a position sensor fixed with respect to the ranging sensor and coupled to the processor, the position sensor operable to output a position, the processor operable to output the distance with the position.

* * * * *

UNITED STATES PATENT AND TRADEMARK OFFICE
CERTIFICATE OF CORRECTION

PATENT NO. : 10,877,153 B2
APPLICATION NO. : 15/617875
DATED : December 29, 2020
INVENTOR(S) : Dominique Paul Barbier Page 1 of 1

It is certified that error appears in the above-identified patent and that said Letters Patent is hereby corrected as shown below:

In the Claims

Column 18, Line 65, Claim 14:
"the a first plurality of distances" should read, --the first plurality of distances--.

Column 18, Line 65, Claim 14:
"operations" should read, --operation--.

Column 18, Line 65, Claim 14:
"second distance data" should read, --the second distance data--.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*